Jan. 6, 1953 W. W. KOMPART 2,624,565
SCRAP MELTING
Filed June 24, 1949
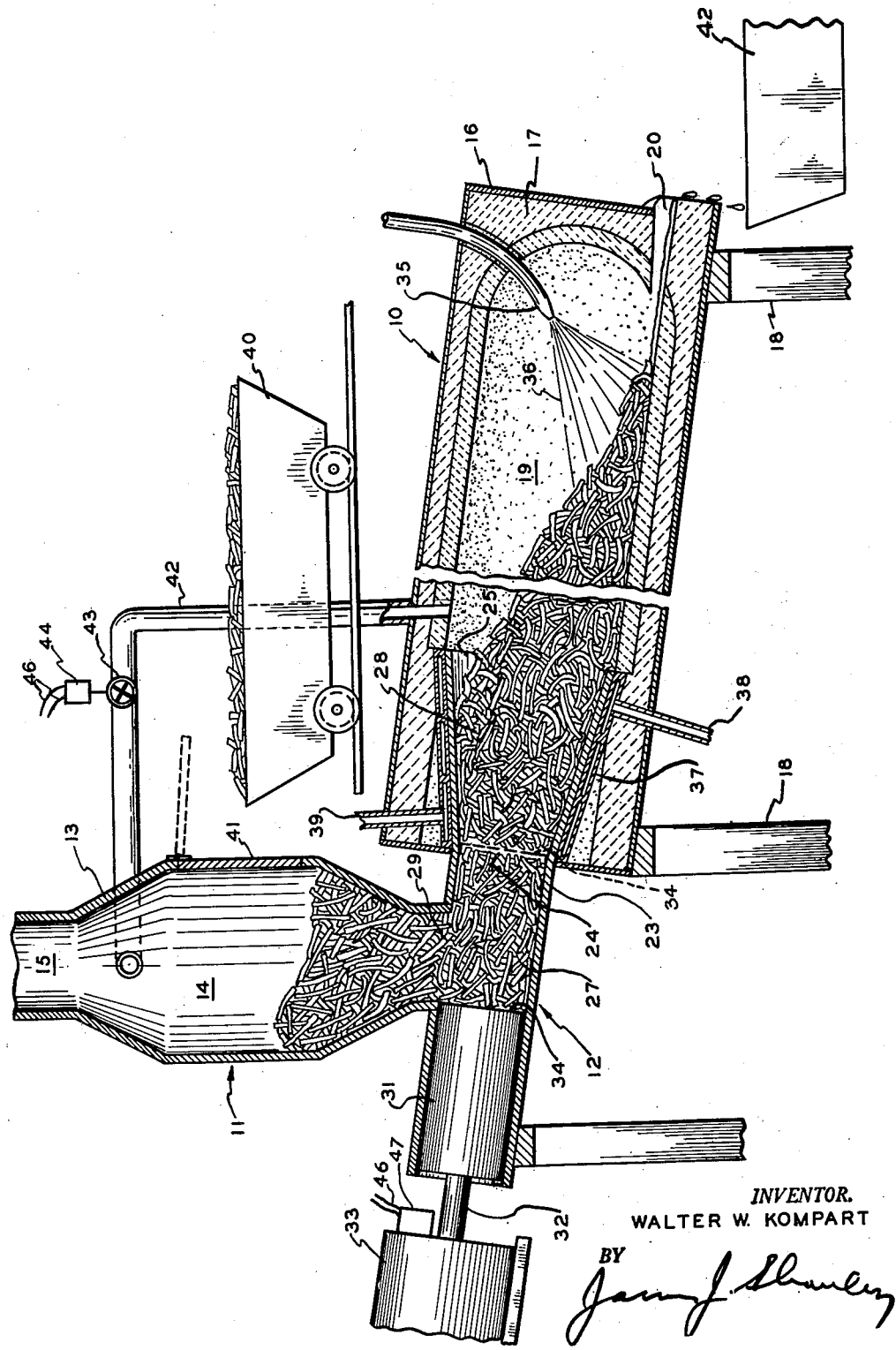
INVENTOR.
WALTER W. KOMPART
BY Patented Jan. 6, 1953

2,624,565

UNITED STATES PATENT OFFICE 2,624,565

SCRAP MELTING

Walter W. Kompart, Steubenville, Ohio, assignor to National Steel Corporation, a corporation of Delaware Application June 24, 1949, Serial No. 101,227

4 Claims. (Cl. 266—33)

This invention relates to an improved apparatus for melting pieces of metal and is primarily concerned with the melting of ferrous metal scrap, such as iron and steel scrap, and particularly scrap that is in relatively small pieces.

In the production of steel in metallurgical furnaces—for example, the open hearth furnace—a relatively large quantity of cold ferrous metal scrap is charged into the furnace and then heated, ultimately, to melt down the scrap. After the scrap has been heated and either partially or completely melted, molten pig iron is charged into the open hearth, and, after suitable treatment, steel is produced containing the proper amount of carbon and other elements and having the desired characteristics. Charging such a large quantity of light solid scrap into the open hearth furnace requires considerable time, as does the heating and melting of the scrap. This in turn reduces the number of heats per furnace for a given period and reduces the number of tons of steel produced per day per furnace. The time required for heating scrap is increased when the scrap is relatively small or light. This type of scrap is cheaper, and it would be economical to use such scrap if the charging time could be greatly reduced.

More recently, it has been proposed that oxygen or oxygen-enriched air be used to burn the fuel for heating open hearth furnaces to increase the output of tons of steel per hour per furnace and thereby produce more steel per day with the same open hearth equipment. When oxygen is used, the problem of lost time in charging the scrap becomes more pronounced as the furnace requires more frequent charging, and the charging period takes a larger percentage of the time per heat.

Attempts have been made to reduce the time lost in charging and melting scrap by melting the scrap and then charging the molten scrap metal into the furnace. These attempts have had various drawbacks, and, insofar as is known to me, the melting of steel and iron scrap prior to charging it into the open hearth is not being practiced by any steel producer.

Accordingly, it is an object of the present invention to provide an improved apparatus for pre-melting scrap before it is charged into a metallurgical furnace that will be efficient and practical.

Another object of the present invention is to provide an improved apparatus for melting scrap that will rapidly and efficiently handle and melt down large quantities of relatively light-weight scrap.

Another object of the present invention is to provide an improved apparatus for the melting of scrap that is so constructed that the hot gases more readily flow through the scrap and more efficiently heat and melt the scrap.

These and other objects and the advantages of the present invention will become apparent when considering the following description, taken with the accompanying drawing which is a diagrammatic, longitudinal sectional view of scrap melting apparatus embodying the principles of the present invention.

The present invention will be described in connection with the melting of steel scrap, but other ferrous metal scrap, such as iron scrap, may be melted in the same manner. In addition, for the sake of clarity, it will be considered that the molten scrap metal is charged into an open hearth furnace, it being understood that the molten metal may be charged into other metallurgical furnaces—for example, a Bessemer converter.

Referring to the drawing, the scrap melting apparatus includes an inclined furnace 10, a hopper or receiver 11 and charging means 12 for feeding the scrap metal from the hopper 11 into the furnace 10. The receiver 11 includes a substantially circular wall 13 enlarged to define a receiving chamber 14. The wall 13 defines a flue 15 at the upper end of chamber 14.

The furnace 10 includes an outer metal shell 16 lined with refractory material 17 and supported on supports 18. The lining defines an inclined melting chamber 19. An outlet 20 for the molten metal is provided at the lower end of the furnace. An elongated wall 23 extends into the furnace 10 and defines an elongated feed passage 24 terminating in an outlet 25. The elongated feed passage 24 includes an inlet portion 27 of uniform diameter throughout its length and an outlet portion 28 extending from the inlet passage portion 27 to an outlet 25. The walls of outlet or discharge passage 28 diverge outwardly toward the outlet 25, and the passage is substantially frusto-conical in shape, with the smaller end being the inlet end and the larger end being the outlet end at 25. The portion of the wall defining passage 27 contains an opening in the side which is also the outlet opening of a passage that communicates with the receiving chamber 14 so that scrap is discharged by gravity from the upper hopper 14 through the passage 29 into the lower inlet passage 27. A piston 31 is mounted in feed passage 24 for movement through passage 27 and is connected through a rod 32 to suitable power-actuating means, such as a hydraulic cylinder 33, for moving the piston through a feed stroke of predetermined length. The length of this feed stroke is at least as long as passage 27. The piston is shown in the drawing as being in the withdrawn position. The inlet passage 27, which is a portion of passage 24, extends from the forward end 34 of piston 31 to the inlet end of outlet passage 28. Passage 24 and piston 31 are of the same size. Preferably, the piston 31 is at least as long as the passage 27 and is at least as long as the feed stroke. When the piston 31 is moved forwardly through a feed stroke, the forward end of piston 31 moves at least all the way through passage 27 to the inlet of passage 28 and, if the stroke is longer than passage 27, the piston will extend into passage 28 a short distance. As the piston is as long as the stroke, the piston 31 extends rearwardly far enough to cover the inlet 29 from chamber 14 so that scrap cannot fall into passage 24 in back of the piston which would interfere with the return stroke. As the length of the piston stroke is at least as long as passage 27, all scrap initially in passage 27 at the start of the feed stroke is pushed into the passage 28 and no scrap compressed by piston 31 on its feed stroke is left in passage 27.

A burner 35 is mounted in furnace 10 so as to direct a flame 36 against the forward face of the pile of scrap in the furnace. The burner 35 is connected to a suitable source of fuel (not shown). Oil or gas may be used as the fuel. The hot gaseous products of combustion flow through the scrap and out stack 15 to preheat the scrap. A water-cooled jacket 37 encircles the wall of outlet passage 28 to cool the wall. Jacket 37 is connected through an inlet pipe 38 to a source of cooling water (not shown) and is connected through an outlet pipe 39 to a sewer or other place of disposal.

In describing the operation of the scrap melting apparatus which is continuous, it will be assumed that the apparatus is initially in the condition shown in the drawing, with scrap in chamber 19, burner 35 on, and piston 31 in the return position. Scrap is charged by means of a buggy 40 or other means through a door 41 in the side of hopper 11 into the chamber 14. The scrap in chamber 14 falls through passage 29 into passage 27 and completely or partially fills passage 27. When it is desirable to feed more scrap into the melting chamber 19, the piston 31 is moved by motor 33 through passage 27 and through a stroke of predetermined length. Forward movement of piston 31 compresses and moves forwardly the scrap in passage 27 which in turn moves scrap in passage 28 forwardly through outlet 25 into chamber 19. As the stroke is as long as or longer than passage 27, the feed stroke moves all of the scrap out of passage 27 into passage 28 where the compressed scrap can expand so that the hot gaseous products of combustion can more readily flow through the scrap. On the return stroke no "pancake" of compressed scrap is left in passage 27 to clog the passage as would be the case if the feed stroke were shorter than passage 27. When piston 31 moves forward, it closes inlet 29 and as the piston is as long as the stroke, the piston maintains the inlet 29 closed until the return stroke when inlet 29 is opened and scrap again falls into passage 27. The piston 31 is operated intermittently to supply scrap to the furnace. The burner 35 operates continuously to melt the scrap. The molten scrap collects in the bottom of chamber 19, flows out outlet 20 into a receiver or ladle 42 which is used to transport the molten scrap metal to the open hearth furnace.

As previously pointed out, the piston 31 on the feed stroke closes inlet 29 so that the gaseous products of combustion from the melting furnace cannot flow out through passage 29. Preferably, a bypass conduit 42 communicating with chamber 19 and flue 15 through hopper chamber 14 is provided for bypassing the gases when passage 29 is closed. A valve 43 is interposed in conduit 42. Means for actuating the valve, such as a solenoid 44, is connected to the valve 43 and through wires 46 to a suitable control means 47 for energizing the solenoid and opening the valve 43 when piston 31 closes passage 29. The control means 47 may be a normally open switch mounted on hydraulic cylinder 33 and operable to the closed position by the inner end of piston rod 32 upon movement of the piston 31 outwardly far enough to close passage 29. With the switch closed the circuit to solenoid 44 through wires 46 is closed and the solenoid is energized to open valve 43. With valve 43 in the normal, closed position, the gases flow through the scrap, but when valve 43 is open, the gases flow through the conduit 42 and out flue 15. The control means for controlling energization of solenoid 44 may be of any suitable type or may be connected to the means for actuating piston 31 so as automatically to open valve 43 when piston 31 is moved forwardly through a feed stroke.

Whenever scrap metal is needed for the open hearth, molten ferrous metal scrap can be quickly poured into the furnace. Charging molten metal requires only a brief period, whereas hours are required to charge and heat scrap metal into an open hearth furnace. The present apparatus reduces the time required per heat and thereby increases production, and this apparatus quickly melts the scrap without clogging so that molten scrap is readily available. The scrap is in a relatively loose condition so that the hot gaseous products of combustion readily flow the scrap to preheat it which in turn reduces fuel costs.

I claim:

1. In apparatus for melting pieces of ferrous metal scrap, a melting furnace defining a melting chamber, means for charging scrap into the melting chamber including an elongated feed passage having a piston mounted therein, said feed passage including an inlet portion of the same uniform size as the piston extending forwardly from the piston, the inlet portion having an inlet opening in the side, and an outlet portion extending from the inlet portion to an outlet communicating with the melting chamber, said outlet portion having sides diverging outwardly toward the outlet, power actuated means for moving the piston forwardly in the feed passage through a feed stroke of predetermined length to push scrap in the inlet portion into the outlet portion, the feed stroke being at least as long as the inlet passage portion whereby all scrap in the inlet portion is pushed out into the outlet portion on each feed stroke, and said piston being at least as long as said stroke whereby the piston maintains the inlet opening closed when in the forward position, flue means communicating with the elongated feed passage whereby gaseous products flow from the melting chamber through the feed passage and out the flue means, and by-pass means between the melting chamber and the flue means operable upon the piston closing communication between the melting chamber and the flue means through the elongated feed passage.

2. In apparatus for melting pieces of ferrous metal scrap, a melting furnace defining a melting chamber, means for charging scrap into the melting chamber including an elongated feed passage having a piston mounted therein, said feed passage including an inlet portion of the same uniform size as the piston extending forwardly from the piston, the inlet portion having an inlet opening in the side, and an outlet portion extending from the inlet portion to an outlet communicating with the melting chamber, said outlet portion having sides diverging outwardly toward the outlet, burner means for heating the scrap metal in the furnace chamber, hopper means defining a receiving chamber for the scrap, a passage between said inlet opening and said receiving chamber for feeding scrap through the inlet opening into the inlet portion of the feed passage, power actuated means for moving the piston forwardly in the feed passage through a feed stroke of predetermined length to push scrap in the inlet portion into the outlet portion, the feed stroke being at least as long as the inlet passage portion whereby all scrap in the inlet portion is pushed out into the outlet portion on each feed stroke, and said piston being at least as long as said stroke whereby the piston maintains the inlet opening closed when in the forward position, the flue means communicating with the receiving chamber whereby gaseous products flow from the melting chamber through the feed passage and the receiving chamber and out the flue means, and by-pass means between the melting chamber and the flue means operable upon the piston closing communication between the melting chamber and the flue means through the feed passage and the receiving chamber.

3. In apparatus for melting pieces of ferrous metal scrap, a melting furnace defining a melting chamber, means for charging scrap into the melting chamber including an elongated feed passage having a piston mounted therein, said feed passage including an inlet portion of the same uniform size as the piston extending forwardly from the piston, the inlet portion having an inlet opening in the side, and an outlet portion extending from the inlet portion to an outlet communicating with the melting chamber, said outlet portion having sides diverging outwardly toward the outlet, burner means for heating the scrap metal in the furnace chamber, hopper means defining a receiving chamber for the scrap, a passage between said inlet opening and said receiving chamber for feeding scrap through the inlet opening into the inlet portion of the feed passage, power actuated means for moving the piston forwardly in the feed passage through a feed stroke of predetermined length to push scrap in the inlet portion into the outlet portion, the feed stroke being at least as long as the inlet passage portion whereby all scrap in the inlet portion is pushed out into the outlet portion on each feed stroke, and said piston being at least as long as said stroke whereby the piston maintains the inlet opening closed when in the forward position, an outlet flue communicating with the receiving chamber, a bypass conduit communicating with the melting chamber and the flue, a normally closed valve in the conduit, and control means for opening the valve upon forward movement of the piston.

4. In apparatus for melting pieces of ferrous metal scrap, a melting furnace defining a melting chamber, means for charging scrap into the melting chamber including an elongated feed passage having a piston mounted therein, said feed passage including an inlet portion of the same uniform size as the piston extending forwardly from the piston, the inlet portion having an inlet opening in the side, and an outlet portion extending from the inlet portion to an outlet communicating with the melting chamber, said outlet portion having sides diverging outwardly toward the outlet, burner means for heating the scrap metal in the furnace chamber, hopper means defining a receiving chamber for the scrap, a passage between said inlet opening and said receiving chamber for feeding scrap through the inlet opening into the inlet portion of the feed passage, flue means communicating with said receiving chamber whereby the gaseous products of combustion from the burner flow from the melting chamber, through the feed passage and the receiving chamber and out the flue means, power actuated means for moving the piston forwardly in the feed passage through a feed stroke of predetermined length to push scrap in the inlet portion into the outlet portion, the feed stroke being at least as long as the inlet passage portion whereby all scrap in the inlet portion is pushed out into the outlet portion on each feed stroke, and said piston being at least as long as said stroke whereby the piston maintains the inlet opening closed when in the forward position, and by-pass means between the melting chamber and the flue means operable upon the piston closing communication between the melting chamber and the flue means through the feed passage and the receiving chamber.

WALTER W. KOMPART.

REFERENCES CITED

The following references are of record in the file of this patent:

UNITED STATES PATENTS

| Number | Name | Date |
| --- | --- | --- |
| 4,527 | Fales | May 16, 1846 |
| 405,134 | Walsh, Jr. | June 11, 1889 |
| 473,741 | Hansen | Apr. 26, 1892 |
| 1,024,623 | Dougherty | Apr. 30, 1912 |
| 1,434,395 | Meinersmann | Nov. 7, 1922 |
| 1,739,278 | Baily | Dec. 10, 1929 |
| 1,904,781 | Crawford | Apr. 18, 1933 |
| 2,068,448 | Cox | Jan. 19, 1937 |
| 2,264,740 | Brown | Dec. 2, 1941 |

FOREIGN PATENTS

| Number | Country | Date |
| --- | --- | --- |
| 8,759 | Great Britain | of 1890 |